(12) United States Patent
Collard

(10) Patent No.: US 6,681,758 B1
(45) Date of Patent: Jan. 27, 2004

(54) OVEN

(75) Inventor: Derek Anton Collard, Midrand (ZA)

(73) Assignee: Dylan Jason Collard, Midrand (ZA)

( * ) Notice: Subject to any disclaimer, the term of this patent is extended or adjusted under 35 U.S.C. 154(b) by 0 days.

(21) Appl. No.: 09/937,345

(22) PCT Filed: Mar. 24, 2000

(86) PCT No.: PCT/ZA00/00056

§ 371 (c)(1),
(2), (4) Date: Feb. 11, 2002

(87) PCT Pub. No.: WO00/56197

PCT Pub. Date: Sep. 28, 2000

(30) Foreign Application Priority Data

Mar. 24, 1999 (ZA) .............................................. 99/2276

(51) Int. Cl.⁷ .................................................. F24C 3/00
(52) U.S. Cl. ..................................................... 126/19 R
(58) Field of Search ........................... 99/401, 445, 340; 126/19

(56) References Cited

U.S. PATENT DOCUMENTS 3,561,348 A * 2/1971 Weir, Sr. et al. ............... 99/259
3,611,915 A * 10/1971 Glaser et al. .................. 99/445
5,117,747 A * 6/1992 Kuechler ....................... 99/400
5,156,083 A * 10/1992 Leighton ...................... 99/421
5,755,154 A * 5/1998 Schroeter et al. ............. 99/401
5,802,958 A * 9/1998 Hermansson ................. 99/349
6,293,271 B1 * 9/2001 Barbour ....................... 126/25
6,314,868 B1 * 11/2001 Christensen et al. .......... 99/340

FOREIGN PATENT DOCUMENTS

DE  4323659 A1 * 7/1993 ............ A47J/37/06
FR  2468839 * 6/1979 ............ F24B/1/00

* cited by examiner

Primary Examiner—Henry Bennett
Assistant Examiner—Sabrina Dagostino
(74) Attorney, Agent, or Firm—Young & Thompson

(57) ABSTRACT

An oven which includes a base, a housing which is located on the base to define an enclosure, the housing being formed with a mouth to provide access to the enclosure, and gas burner unit for heating the enclosure. The housing includes a vent and chimney and is constructed from at least an insulating layer and a refractory layer.

22 Claims, 2 Drawing Sheets

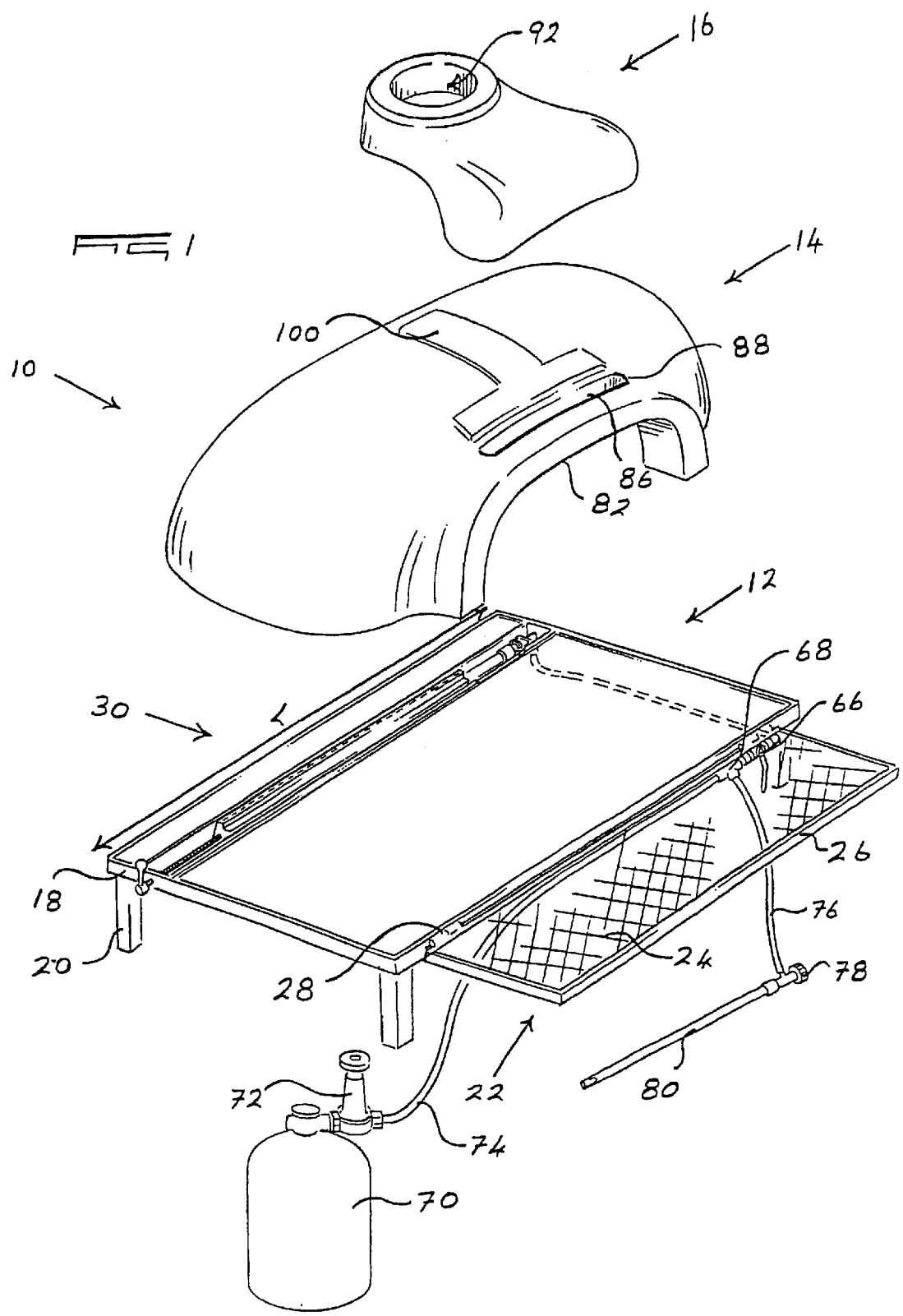

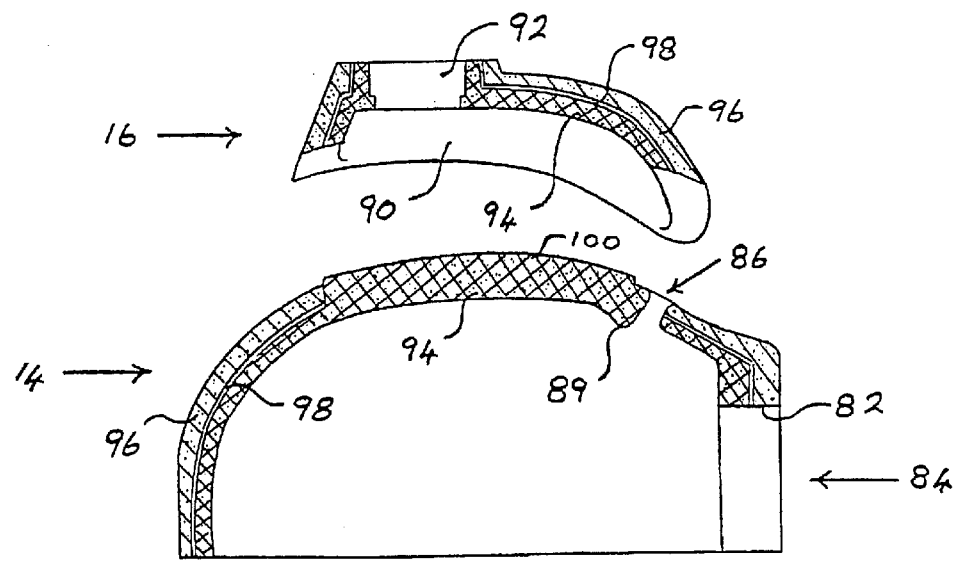
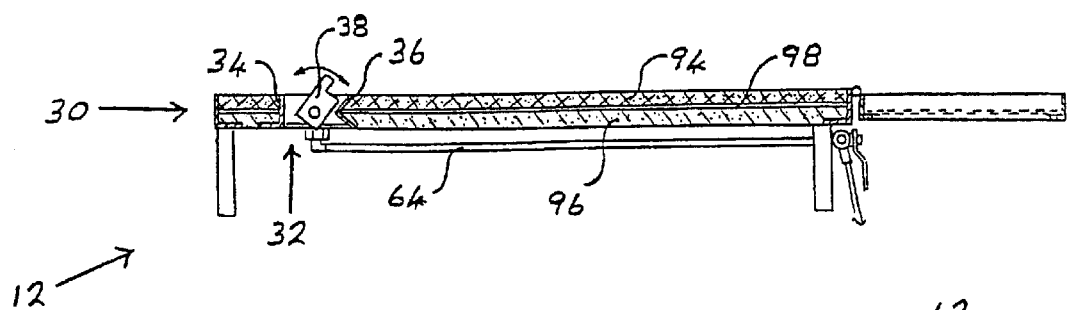
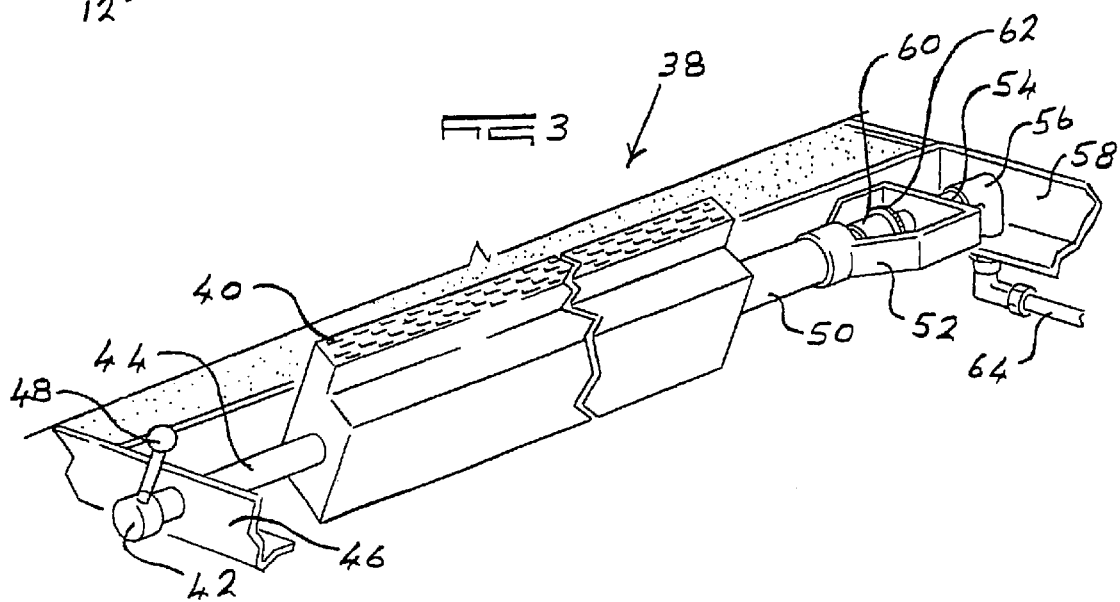

OVEN

BACKGROUND OF THE INVENTION

This invention relates to an oven and to a method of constructing an oven.

The oven of the invention is particularly suited for the cooking of pizzas, although it is by no means restricted to this application for it may be used for the preparation of all types of foodstuffs in a variety of ways, including roasting, baking, frying, etc.

SUMMARY OF INVENTION

The invention provides an oven which includes a base, a housing which is located on the base to define an enclosure, the housing being formed with a mouth to provide access to the enclosure, and gas burner means for heating the enclosure.

The gas burner means may be of any appropriate type and preferably includes an elongate burner which is mounted for pivotal movement relatively to the base.

The elongate burner may be pivotally mounted to the base close to a side of the enclosure which opposes the mouth.

The base may be formed with a slot and the elongate burner may be positioned at least partly inside the slot.

The oven may include a valve which is fixed to the base and which is used for controlling gas flow to the gas burner means.

An igniter for the gas burner means may be fixed to the valve. This may be effected directly or indirectly e.g. through the medium of a gas conduit.

Preferably the igniter is connected to the valve by means of a flexible pipe so that it can be inserted through the mouth of the housing to enable the gas burner means to be ignited.

The housing may be formed with a vent in an upper side thereof and a cover which forms a chimney outlet may be mounted to the housing over the vent.

An inner surface of the housing, adjacent the vent and on a side thereof which is remote from the mouth, may be formed with an inwardly projecting formation which extends alongside the vent at least for the length of the vent. The purpose of the formation is to deflect heat downwardly towards the interior of the housing, away from the vent, to reduce unnecessary escape of heat from the housing.

The components of the oven may be formed in any appropriate manner but preferably are formed from one or more layers of suitable material. Thus, according to a preferred form of the invention, the housing is formed with at least inner and outer layers of materials.

The inner layer may be a layer of high-density refractory material while the outer layer may be a low density insulating material.

One or more reinforcing layers of any appropriate material may be positioned in the wall of the housing. Preferably at least one reinforcing layer is positioned between the inner and outer layers. The reinforcing layer may be a polyester fibre mat.

The base may be formed in a similar manner with at least upper and lower layers of materials, with the upper layer being a high density refractory material and the lower layer being a low density insulating material.

Again it is possible to position at least one reinforcing layer between the said upper and lower layers in the base.

The base may be of any suitable shape and size, but preferably is rectangular with a planar upper surface. The base may be bonded to and supported by a suitable frame, e.g. of steel. Legs may extend from the base to provide an elevated support for the base.

A work platform may be positioned adjacent the mouth. The work platform may be of a suitable heat resistant material such as expanded mesh, gauze or the like. Preferably the work platform is formed from steel and is attached in any suitable manner to the housing or the base. In a preferred embodiment the work platform is mounted to the steel frame and is pivotally movable relatively thereto.

According to a different aspect of the invention there is provided an oven which includes a base, a housing mounted to and extending over at least a substantial portion of the base, and a cover fixed to the housing, over a vent, to form a chimney outlet from the housing.

As previously indicated the base, housing and cover are preferably each formed from reinforced layers of refractory material.

Gas burner means of any appropriate type may be mounted inside the housing.

The housing may include a mouth on a first side and the gas burner means may be provisioned adjacent a second side of the housing opposing the first side.

The gas burner means may be mounted for pivotal movement relatively to the base.

The invention further extends to an oven which includes a housing forming at least part of an oven enclosure, the housing being formed from at least two layers of material and, preferably, with an inner layer of a high density refractory material and an outer layer of an insulating material.

The invention also provides an oven which includes a dome-shaped housing and gas burner means mounted for limited pivotal movement inside the housing.

The invention further extends to a method of forming an oven which includes the steps of securing a housing to a planar base, and securing a cover to the housing, the cover extending over a vent in the housing and forming a chimney outlet from the housing.

The housing may be secured to the base using a bonding medium, e.g. a suitable adhesive, and a cover may be secured to the housing using a similar bonding medium.

The invention also provides a method of forming a component of an oven which includes the steps of fabricating a first side of the component from a high density refractory material and fabricating a second side of the component which is bonded to the first side, from an insulating material.

A flexible reinforcing layer may be positioned between the said first and second sides. The method may be used for forming a dome-shaped housing for the oven and at least the first side may be fabricated over a suitable curved former.

When the method is used for forming a base of an oven the component may be planar and the said sides may be fabricated over a planar surface, with the said sides being bonded or otherwise fixed to a supporting framework.

BRIEF DESCRIPTION OF THE DRAWINGS

The invention is further described by way of example with reference to the accompanying drawings in which:

FIG. 1 is an exploded view in perspective of an oven according to one form of the invention, FIG. 2 is a cross sectional view through the oven of FIG. 1, and FIG. 3 is a perspective view of a gas burner used in the oven of FIG. 1.

DESCRIPTION OF PREFERRED EMBODIMENTS

The accompanying drawings illustrate an oven 10 according to the invention which includes a base 12, a housing 14 and a cover 16.

The base includes a peripheral steel frame 18 which is supported on four downwardly extending legs 20. A working surface or platform 22, formed from steel mesh or a grid 24 fixed to a frame 26 is mounted by means of hinges 28 to what, in use, is a front side of the base.

As is shown particularly in FIG. 2 the base, towards a rear side 30, is formed with a transversely extending slot 32 defined by opposing lengths of angle iron 34 and 36 respectively. An elongate gas burner 38, of the kind shown in FIG. 3, is located in the slot. The gas burner 38 is a ribbon burner formed from stainless steel, and includes a number of gas apertures 40 which extend in a substantially linear array across a greater part of the length L of the base. The burner is mounted for rotation about an axle 42. On one side the axle consists of a rod 44 which projects from the burner through a portion 46 of the frame 18. A handle 48 is attached to an extension of the rod 44.

On its opposing side the axle is defined by a tubular member 50 which has a collar 52 mounted to a short length of pipe 54 which protrudes from an elbow 56 which is fixed to a portion 58 of the frame 18. A gas inlet nozzle 60 is fixed to a free end of the pipe 54 and is positioned inside the collar 52. The nozzle, in turn, extends into the interior of the tubular member 50. A small annular gap is defined between opposing surfaces of the tubular member 50 and the nozzle 60. This gap provides a passage through which air can be entrained by means of the venturi effect, into the interior of the burner. The nozzle 60 has a riffled edge 62 which facilitates rotation of the nozzle about the pipe 54. In this way the nozzle, which is threadedly engaged with the pipe 54, can be moved to and fro relatively to the pipe to enable the annular gap between the nozzle and the tubular member 50 to be adjusted. This allows the air/gas mixture to be adjusted according to requirement.

It is to be noted that the slot 32 is shaped in such a way that limited pivotal movement of the gas burner relatively to the base is permissible, see FIG. 2.

A gas conduit 64 extends from the elbow 56 to a gas control valve 66 on a front side of the frame. A T-piece 68 is connected to the valve on an upstream side thereof. A bottle 70 of liquified gas can be connected via a high pressure gas regulator 72, through the medium of a flexible hose 74 to one inlet of the T-piece 68. A second inlet of the T-piece is connected, substantially in permanent fashion, to a flexible hose 76 which, in turn, is connected to a gas control valve 78 from which extends an elongate steel tube 80.

The housing 14 is dome-shaped and includes a recess 82 which, when the housing is fixed to the base, defines a mouth 84 immediately above the base 12.

The housing viewed in plan is substantially oval or elliptical with a domed upper surface. A vent 86 is formed in the upper surface. The vent is in the shape of a slot 88 which extends transversely to the mouth 84. On its inner surface which opposes the base 12, the housing has a projection 89 which extends alongside the vent generally in the longitudinal direction of the base.

The cover 16 has a downwardly facing recess 90 which is in communication with an upwardly extending aperture 92 which forms a chimney outlet.

As is evident particularly from FIG. 2 the base, the housing and the cover each have a laminated type of construction consisting, in this example, of a layer 94 of high density refractory material and a layer 96 of low density insulating material which, generally speaking, is on an outer side of the oven once the components are assembled. A flexible reinforcing layer 98 of any appropriate material such as polyester fibre mat is positioned between the layers 94 and 96.

When the base is constructed the frame 18 is inverted and placed on a planar underlying surface, not shown. The material which makes up the layer 94 of the base is placed on the planar surface and worked into the frame. The fibre mat reinforcing layer 98 is then positioned over the layer 94 and, while the layer 94 is still green and unset, the layer 96 is positioned over the mat 98 in such a way that an integral bond is formed between the layers 94, 98 and 96.

The housing 14 is formed in a similar manner except that a curved former, not shown, is used as a mould. The inner layer 94 is hand-packed onto the former and then covered with the reinforcing layer 98. The outer low density insulating material is then packed over the fibre mat in such a way that it bonds through the mat to the material 94. The vent 86 is formed during this process.

FIG. 1 illustrates that a roughly T-shaped section 100 on an upper surface of the housing is not covered with the insulating layer 96. The T-shaped section 100 is formed only from the high density refractory material 94 although, optionally, a portion of the reinforcing layer 98 may extend through the T-shaped section 100.

The cover 16 is formed in a similar way to the manner in which the housing is formed in that material 94 is initially packed over a shaped former and then covered with the reinforcing layer 98 whereafter the insulating material 96 is packed over the layer.

It is emphasised that in the fabrication process the layers are packed one on the other in such a way that they are intimately bonded to one another to provide an integral type construction.

According to requirement additional reinforcing material may be used, embedded in the thickness of each component of the oven.

The oven is normally supplied in the kit form shown in FIG. 1 in that the cover, housing and base are separate from each other. This facilitates storage and transport. Generally the oven is assembled on site although this is not essential. The housing is placed on the base and preferably is bonded to the base using a suitable bonding medium such as a cementitious or other heat resistant adhesive. The cover 16 is bonded in a similar way to the housing so that it overlies the slot 88 and the T-shaped section 100. According to requirement a chimney stack, not shown, can be fixed to the aperture 92.

When the oven is to be used the regulator 72 is opened and the gas control valve 78 is opened so that gas can flow through the pipes 74 and 76 to an outlet of the steel tube 80. Gas flowing from the tube is ignited to produce a pilot flame. The tube 80 is inserted through the mouth 84 and the valve 66 is then opened to a required extent so that gas can flow though the pipe 64 to the burner 38. The pilot flame at the end of the tube is brought close to the gas escaping from the burner 38 to ignite the gas. The valve 78 is then closed.

The valve 66 is adjusted to obtain a flame inside the housing of the required height and, during the cooking process, is adjusted according to requirement.

The inclination of the burner 38 can be adjusted by means of the handle 48. Normally the flames extending from the burner are directed steeply upwardly towards an inner roof of the housing. The enclosure which is formed by the base and the housing is rapidly heated by the gas burner and the interior temperature rises quickly. Heat waves and thermal currents inside the enclosure are directed downwardly towards the base by virtue of the shaped material 94 is initially packed over a shaped former and then covered with the reinforcing layer 98 whereafter the insulating material 96 is packed over the layer.

It is emphasised that in the fabrication process the layers are packed one on the other in such a way that they are intimately bonded to one another to provide an integral type construction.

According to requirement additional reinforcing material may be used, embedded in the thickness of each component of the oven.

The oven is normally supplied in the kit form shown in FIG. 1 in that the cover, housing and base are separate from each other. This facilitates storage and transport. Generally the oven is assembled on site although this is not essential. The housing is placed on the base and preferably is bonded to the base using a suitable bonding medium such as a cementitious or other heat resistant adhesive. The cover 16 is bonded in a similar way to the housing so that it overlies the slot 88 and the T-shaped section 100. According to requirement a chimney stack, not shown, can be fixed to the aperture 92.

When the oven is to be used the regulator 72 is opened and the gas control valve 78 is opened so that gas can flow through the pipes 74 and 76 to an outlet of the steel tube 80. Gas flowing from the tube is ignited to produce a pilot flame. The tube 80 is inserted through the mouth 84 and the valve 66 is then opened to a required extent so that gas can flow through the pipe 64 to the burner 38. The pilot flame at the end of the tube is brought close to the gas escaping from the burner 38 to ignite the gas. The valve 78 is then closed.

The valve 66 is adjusted to obtain a flame inside the housing of the required height and, during the cooking process, is adjusted according to requirement.

The inclination of the burner 38 can be adjusted by means of the handle 48. Normally the flames extending from the burner are directed steeply upwardly towards an inner roof of the housing. The enclosure which is formed by the base and the housing is rapidly heated by the gas burner and the interior temperature rises quickly. Heat waves and thermal currents inside the enclosure are directed downwardly towards the base by virtue of the shaped protection 89 adjacent the vent 86.

As has been indicated in the preamble to this specification the oven is suitable for the cooking of practically all types of foodstuffs. For example pizzas may be cooked directly on the base once it has been heated to the appropriate temperature. A steel tray can also be passed through the mouth 84 and meat can be barbequed or roasted on the tray. It is also possible to bake bread inside the oven and, generally, to engage in practically any type of cooking process.

Another possibility is to mount a rotisserie inside the housing with the rotisserie being driven for example by means of an electric motor which is fixed to a shaft which extends through a wall of the housing.

The work platform 22 is provided for ease of use in that foodstuffs can be placed on the platform before being passed through the mouth into the interior of the oven and, conversely, food can be kept on the platform after having been cooked in order to be kept warm.

Gases and fumes generated during the cooking process are passed through the slot 88 into the recess 90 and then exhausted to atmosphere through the aperture 92.

The T-shaped section 100 is, as has been noted, essentially high density refractory material. The interior of the chimney outlet formed by the cover 16 is very hot and there is little point in providing insulating material facing into the interior of the recess 90.

The high density refractory material 94, due to its density, retains heat generated by the gas burner. The heat is evenly distributed throughout the interior of the oven and localised hot spots are substantially avoided. This prevents uneven cooking and reduces the likelihood of the oven cracking.

On the other hand the low density insulating material on the outer side of the oven ensures that the outer side does not reach excessively high temperatures and this reduces the likelihood of a person being injured or burnt when coming into contact with the oven exterior. The insulating material also acts to confine the heat which is generated by the gas burner to the interior of the oven.

It is has been noted that the cooking process can be controlled at least in two ways, namely by adjusting the valve 66 to control the amount of heat generated by the gas burner and secondly by adjusting the orientation of the gas burner relatively to the base. When the gas burner is downwardly orientated the flames emitted by the burner are projected over food on the base while, if the burner is vertically oriented, the flames are further removed from foodstuff on the base.

What is claimed is:

1. An oven which includes a base, a housing which is located on the base to define an enclosure, the housing being formed with a mouth to provide access to the enclosure, and gas burner means for heating the enclosure,
    wherein the gas burner means includes an elongate burner which is mounted for pivotal movement relatively to the base.

2. An oven according to claim 1, wherein the elongate burner is pivotally mounted to the base close to a side of the enclosure which opposes the mouth.

3. An oven according to claim 2 wherein the base is formed with a slot and the elongate burner is positioned at least partly inside the slot.

4. An oven according to claim 1 which includes a valve, for controlling gas flow to the gas burner means, fixed to the base.

5. An oven according to claim 4 which includes an igniter for the gas burner means, fixed to the valve.

6. An oven which includes a base, a housing which is located on the base to define an enclosure, the housing being formed with a mouth to provide access to the enclosure, and gas burner means for heating the enclosure, wherein,
    the housing is formed with a vent in an upper side thereof, and a cover forming a chimney outlet is mounted to the housing over the vent, and
    an inner surface of the housing, adjacent the vent and on a side thereof which is remote from the mouth, is formed with an inwardly projecting formation which extends alongside the vent at least for the length of the vent.

7. An oven which includes a base, a housing which is located on the base to define an enclosure, the housing being formed with a mouth to provide access to the enclosure, and gas burner means for heating the enclosure, wherein,
    the housing is formed with at least inner and outer layers of materials, and
    the inner layer of material is a high density refractory material and the outer layer of material is a low density insulating material.

8. An oven according to claim 7 which includes at least one reinforcing layer between the inner and outer layers.

9. An oven according to claim 8 wherein the reinforcing layer is a polyester fibre mat.

10. An oven which includes a base, a housing which is located on the base to define an enclosure, the housing being formed with a mouth to provide access to the enclosure, and gas burner means for heating the enclosure, wherein the base is formed with at least upper and lower layers of materials.

11. An oven according to claim 10 wherein the upper layer of material is a high density refractory material and the lower layer of material is a low density insulating material.

12. An oven according to claim 10 which includes at least one reinforcing layer between the upper and lower layers.

13. An oven according to claim 12 wherein the reinforcing layer is a polyester fibre mat.

14. An oven according to claim 1 wherein the base is bonded to and supported by a steel frame.

15. An oven according to claim 1 which includes a work platform adjacent the mouth.

16. An oven according to claim 15 wherein the work platform is mounted for pivotal movement relatively to the housing.

17. An oven which includes a base, a housing mounted to and extending over at least a substantial portion of the base, a cover fixed to the housing, over a vent, to form a chimney outlet from the housing, and a gas burner means for heating an interior of the housing, wherein the gas burner means is mounted for pivotal movement relatively to the base.

18. An oven according to claim 17 wherein the base, housing and cover are formed from reinforced layers of refractory material.

19. An oven according to claim 17, wherein the housing has a mouth on a first side and the gas burner means is positioned adjacent a second side of the housing opposing the first side.

20. An oven which includes a housing forming at least part of an oven enclosure, the housing being formed from at least two layers of material, wherein the housing has a reinforcing layer between the two layers of material.

21. An oven according to claim 20 wherein the housing has an inner layer of a high density refractory material and an outer layer of an insulating material.

22. An oven which includes a dome-shaped housing and gas burner means mounted for limited pivotal movement inside the housing.

* * * * *